United States Patent
Bagheri et al.

(10) Patent No.: US 12,047,168 B2
(45) Date of Patent: Jul. 23, 2024

(54) METHOD AND APPARATUS FOR GENERATING A CSI REPORT

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US); Ravi Kuchibhotla, Clarendon Hills, IL (US); Tyler Brown, Lake Zurich, IL (US); Robert T. Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 499 days.

(21) Appl. No.: 16/586,901

(22) Filed: Sep. 27, 2019

(65) Prior Publication Data
US 2020/0107319 A1 Apr. 2, 2020

Related U.S. Application Data

(60) Provisional application No. 62/739,043, filed on Sep. 28, 2018.

(51) Int. Cl.
*H04W 72/04* (2023.01)
*H04L 1/00* (2006.01)
(Continued)

(52) U.S. Cl.
CPC .......... *H04L 1/0026* (2013.01); *H04L 1/1825* (2013.01); *H04W 24/10* (2013.01);
(Continued)

(58) Field of Classification Search
CPC .......... H04W 72/042; H04W 72/0446; H04W 24/10; H04W 72/14; H04W 72/1231;
(Continued)

(56) References Cited

U.S. PATENT DOCUMENTS 10,034,275 B2 * 7/2018 Kim .................. H04L 1/189
10,264,585 B2 * 4/2019 Kim .................. H04L 1/0026
(Continued)

FOREIGN PATENT DOCUMENTS

WO WO2018223349 A1 12/2018
WO WO2019134099 A1 7/2019

OTHER PUBLICATIONS

Lee et al. U.S. Appl. No. 62/661,613P, filed Apr. 23, 2018 (Year: 2018).*
(Continued)

*Primary Examiner* — Wutchung Chu
(74) *Attorney, Agent, or Firm* — Loppnow & Chapa; Matthew C. Loppnow

(57) ABSTRACT

According to a possible embodiment, a control channel can be received in a first downlink slot. The control channel can contain DCI with a downlink DCI format. The DCI can contain a CSI report trigger that triggers a CSI report. The DCI can schedule PDSCH transmissions repeated a number of times in a set of downlink slots. Each PDSCH transmission of the repeated PDSCH transmissions can be in a separate downlink slot. A CSI report can be generated in response to receiving the CSI report trigger. At least one uplink resource to transmit the generated CSI report can be determined. The at least one uplink resource can be determined based on the number of repeated PDSCH transmissions. The generated CSI report can be transmitted in the determined at least one uplink resource.

20 Claims, 5 Drawing Sheets

(51) Int. Cl.
*H04L 1/1825* (2023.01)
*H04W 24/10* (2009.01)
*H04W 72/0446* (2023.01)
*H04W 72/21* (2023.01)
*H04W 72/23* (2023.01)
*H04W 80/08* (2009.01)

(52) U.S. Cl.
CPC ....... *H04W 72/0446* (2013.01); *H04W 72/21* (2023.01); *H04W 72/23* (2023.01); *H04W 80/08* (2013.01)

(58) Field of Classification Search
CPC ........... H04W 72/1289; H04W 74/002; H04W 72/0413; H04W 80/08; H04W 24/08; H04W 4/005; H04W 4/70; H04W 72/0453; H04W 72/08; H04W 72/085; H04W 72/21; H04W 72/23; H04W 72/542; H04L 1/08; H04L 1/0026; H04L 1/1825; H04L 5/0053; H04L 1/1671; H04L 1/1861; H04L 5/0016; H04L 5/0057; H04L 1/0027; H04L 1/0006; H04L 5/0037; H04L 1/0031; H04L 27/261; H04L 1/16; H04L 5/0055; H04L 5/001; H04L 5/0048; H04L 5/0073; H04L 1/1854; H04B 17/309; H04B 7/0632; H04B 7/0626; H04B 7/0452; H04B 7/0639; H04B 17/24; H04B 7/0665; H04B 17/30; H04B 7/0421; H04B 7/0417; H04B 7/0413; H04B 7/0486; H04B 17/345; H04B 7/0478

See application file for complete search history.

(56) References Cited

U.S. PATENT DOCUMENTS

| | | | | |
|---|---|---|---|---|
| 10,447,454 | B2* | 10/2019 | Kim | H04B 5/0057 |
| 11,218,279 | B2* | 1/2022 | Kwak | H04L 1/1893 |
| 2013/0223301 | A1 | 8/2013 | Lee et al. | |
| 2013/0294351 | A1 | 11/2013 | Kwon et al. | |
| 2013/0301548 | A1 | 11/2013 | Etemad et al. | |
| 2015/0043394 | A1* | 2/2015 | Lin | H04L 1/1893 370/280 |
| 2015/0098347 | A1 | 4/2015 | Guo et al. | |
| 2016/0218788 | A1* | 7/2016 | Yum | H04L 1/812 |
| 2016/0269160 | A1* | 9/2016 | Noh | H04B 7/0417 |
| 2016/0285535 | A1* | 9/2016 | Kim | H04W 24/08 |
| 2016/0323901 | A1* | 11/2016 | Yum | H04W 72/542 |
| 2017/0048052 | A1 | 2/2017 | Lee et al. | |
| 2017/0288757 | A1* | 10/2017 | Yum | H04B 7/0626 |
| 2017/0366377 | A1* | 12/2017 | Papasakellariou | H04L 5/0092 |
| 2018/0020430 | A1 | 1/2018 | Aiba et al. | |
| 2018/0054280 | A1* | 2/2018 | Fu | H04L 1/1671 |
| 2018/0091280 | A1* | 3/2018 | Kim | H04W 4/70 |
| 2018/0227031 | A1* | 8/2018 | Guo | H04W 24/10 |
| 2019/0141546 | A1 | 5/2019 | Zhou et al. | |
| 2019/0141677 | A1* | 5/2019 | Harrison | H04L 5/0082 |
| 2019/0150183 | A1 | 5/2019 | Aiba et al. | |
| 2019/0158216 | A1 | 5/2019 | Suzuki et al. | |
| 2019/0174466 | A1 | 6/2019 | Zhang et al. | |
| 2019/0207737 | A1* | 7/2019 | Babaei | H04L 5/0098 |
| 2019/0215130 | A1 | 7/2019 | Aiba et al. | |
| 2019/0215870 | A1 | 7/2019 | Babaei et al. | |
| 2019/0268059 | A1* | 8/2019 | Yang | H04B 7/063 |
| 2019/0281588 | A1 | 9/2019 | Zhang et al. | |
| 2020/0008225 | A1* | 1/2020 | Lee | H04W 72/1273 |
| 2020/0045676 | A1* | 2/2020 | Ryu | H04L 5/001 |
| 2020/0107319 | A1* | 4/2020 | Bagheri | H04L 5/0053 |
| 2020/0196179 | A1* | 6/2020 | Kim | H04B 7/0695 |
| 2020/0214006 | A1* | 7/2020 | Choi | H04L 1/0006 |
| 2020/0280357 | A1* | 9/2020 | Bae | H04E 24/10 |
| 2020/0288479 | A1 | 9/2020 | Xi et al. | |
| 2020/0304263 | A1 | 9/2020 | Zhang et al. | |
| 2020/0313823 | A1 | 10/2020 | Zhang et al. | |
| 2020/0343995 | A1 | 10/2020 | Shao et al. | |
| 2021/0051667 | A1 | 2/2021 | Yang et al. | |
| 2021/0105055 | A1 | 4/2021 | Chae et al. | |
| 2021/0105753 | A1 | 4/2021 | Zhang et al. | |
| 2021/0143886 | A1 | 5/2021 | Chung et al. | |
| 2021/0321446 | A1 | 10/2021 | Lee et al. | |

OTHER PUBLICATIONS

Yang et al. U.S. Appl. No. 62/635,995, filed Feb. 27, 2018 (Year: 2018).*

Kim et al. U.S. Appl. No. 62/720,865, filed Aug. 21, 2018 (Year: 2018).*

Epple, PCT International Search Report, International Application No. PCT/IB2019/058259, European Patent Office, Rijswijk, NL, dated Dec. 16, 2019.

Huawei et al: "PDCCH repetition for URLLC", 3GPP Draft; R1-1803658, 3rd Generation Partnership Project (3GPP), Mobile Competence Centre; 650, Route Des Lucioles ; F-06921 Sophia-Antipolis Cedex; France , vol. RAN WG1, No. Sanya, China; Apr. 16, 2018-Apr. 20, 2018 Apr. 15, 2018 (Apr. 15, 2018).

Epple, PCT International Search Report, International Application No. PCT/IB2019/058260, European Patent Office, Rijswijk, NL, dated Dec. 16, 2019.

Qualcomm Incorporated: "Maintenance for CSI Measurement", 3GPP Draft; R1-1804785, 3rd Generation Partnership Project (3GPP), Mobile Competence Centre ; 650, Route Des Lucioles ; F-06921 Sophia-Antipolis Cedex , FRANCE, vol. RAN WG1, No. Sanya, China; Apr. 16, 2018-Apr. 20, 2018, Apr. 15, 2018 (Apr. 15, 2018).

Fujitsu: "Discussion on aperiodic CSI-RS triggering offset configuration in case of one resource set over multiple slots", 3GPP Draft; R1-1800125 Aperiodic CSI-RS Triggering Offset Configuration for Multiple Slots Final, 3rd Generation Partnership Project (3GPP), Mobile Competence Centre; 650, Route Des Lucioles ; F-0692 vol. RAN WG1, No. Vancouver, Canada; Jan. 22, 2018-Jan. 26, 2018 Jan. 12, 2018 (Jan. 12, 2018).

Nguyen, Notice of References cited, PTO-892, U.S. Appl. No. 16/586,908 U.S. Patent and Trademark Office, Jun. 7, 2022.

Nguyen, Notice of References cited, PTO-892, U.S. Appl. No. 16/586,908 U.S. Patent and Trademark Office, Nov. 15, 2022.

Nguyen, Notice of References cited, PTO-892, U.S. Appl. No. 16/586,908 U.S. Patent and Trademark Office, Feb. 9, 2023.

Epple, Communication pursuanr o Article 94(3) EPC, Application No. 19 783 133.2-1206, European Patent Office, Munich, Germany, Mar. 22, 2022.

* cited by examiner

METHOD AND APPARATUS FOR GENERATING A CSI REPORT

BACKGROUND

1. Field

The present disclosure is directed to a method and apparatus for communicating on a wireless network. More particularly, the present disclosure is directed to generating Channel State Information (CSI) and determining a downlink slot of a CSI resource.

2. Introduction

Presently, wireless communication devices, such as User Equipments (UEs), communicate with other communication devices using wireless signals over a network. CSI is used by the network to adjust Downlink (DL) transmission parameters to UEs. CSI is reported by the UEs to the network and the reporting can be in a periodic, a semipersistent, and/or an a-periodic manner. In periodic reporting, a UE reports CSI to the network periodically with a configured periodicity. Semi-persistent CSI reporting is similar to periodic reporting where the difference is that CSI reporting can be activated/deactivated by Downlink Control Information (DCI) for semi-persistent CSI reporting on a Physical Uplink Shared Channel (PUSCH) or activated/deactivated by a Medium Access Control-Control Element (MAC-CE) for semi-persistent CSI reporting on a Physical Uplink Control Channel (PUCCH). A-periodic CSI (A-CSI) reporting is triggered by DCI. In existing New Radio (NR) specifications, a-periodic reporting is triggered by an Uplink (UL) DCI, and the CSI report is transmitted on an UL data channel, such as a PUSCH.

For increasing reliability of DL transmissions, PDSCH and/or PDCCH can be repeated multiple times. For example, for Long Term Evolution (LTE)-High Reliability Low Latency Communications (HRLLC), such as Ultra-Reliable Low-Latency Communication (URLLC) with LTE operation, a PDCCH indicates a number of PDSCH transmissions associated with the PDCCH. The PDCCH may or may not be transmitted with a PDSCH repetition, in that there may not be a PDCCH associated with each instance of PDSCH repetition. For example, the number of PDSCH repetitions may be 4 and number of repeated PDCCHs may be 2. The PDSCH transmissions can be soft combined after a PDCCH is successfully received. The number of PDSCH transmissions associated with the PDCCH starting with the current Transmit Time Interval (TTI), is indicated in a DCI field.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments can provide a method and apparatus for communicating on a wireless network. At least some embodiments can provide a method and apparatus for generating CSI. At least some embodiments can provide a method and apparatus for determining a downlink slot of a CSI resource.

According to a possible embodiment, a control channel can be received in a first downlink slot. The control channel can contain DCI with a downlink DCI format. The DCI can contain a CSI report trigger that triggers a CSI report. The DCI can schedule PDSCH transmissions repeated a number of times in a set of downlink slots. Each PDSCH transmission of the repeated PDSCH transmissions can be in a separate downlink slot. A CSI report can be generated in response to receiving the CSI report trigger. At least one uplink resource to transmit the generated CSI report can be determined. The at least one uplink resource can be determined based on the number of repeated PDSCH transmissions. The generated CSI report can be transmitted in the determined at least one uplink resource.

According to another possible embodiment a configuration parameter for a CSI resource set can be received. The configuration parameter can indicate a first offset applicable to the CSI resource set. A control channel containing DCI with a downlink DCI format can be received in a first downlink slot. The DCI can indicate a second offset applicable to the CSI resource set. A second downlink slot in which the CSI resource set is transmitted by a network entity for an active Bandwidth Part (BWP) can be determined based on the first offset and the second offset.

Figure 1:
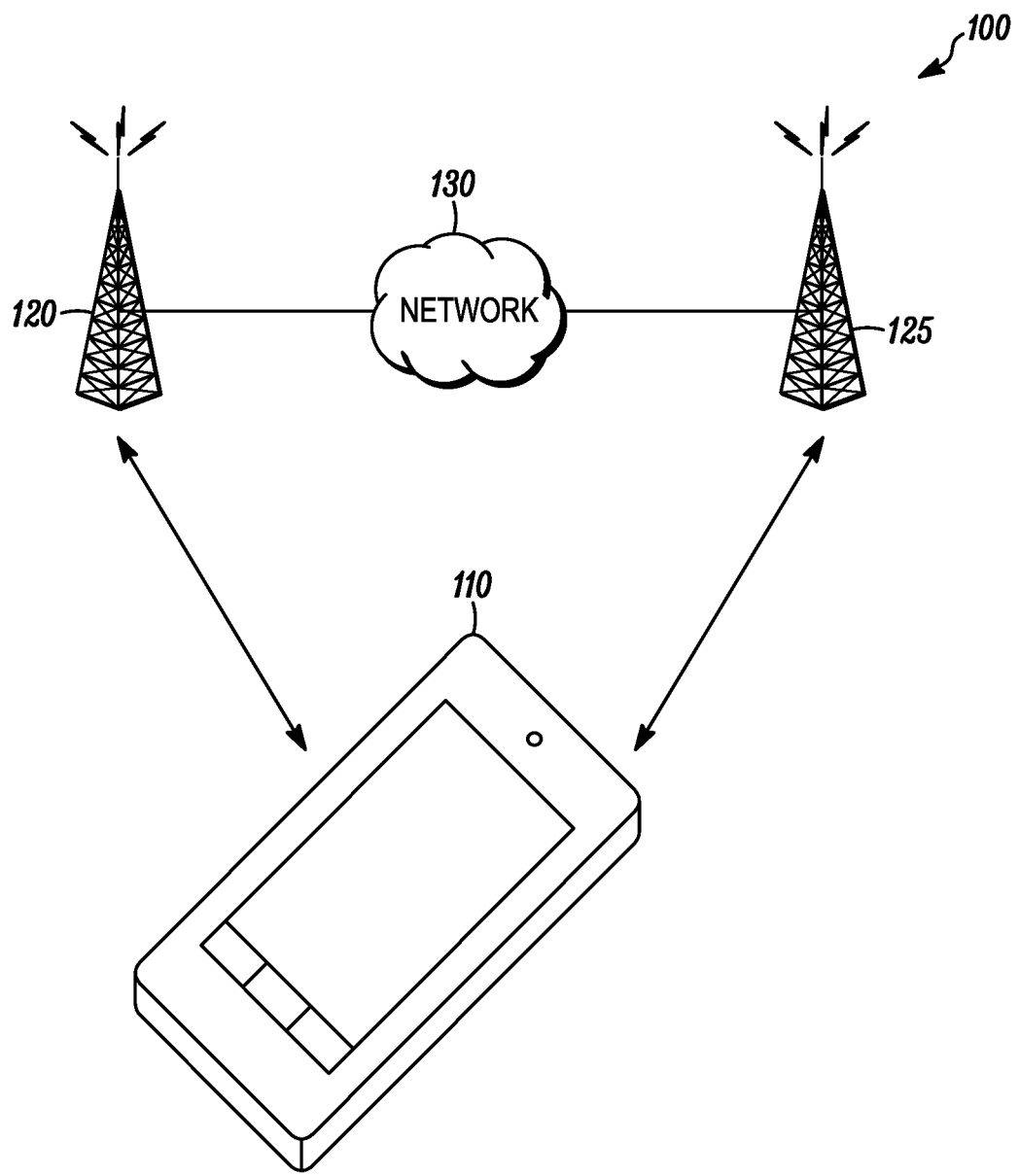
FIG. 1 is an example block diagram of a system according to a possible embodiment.

FIG. 1 is an example block diagram of a system 100 according to a possible embodiment. The system 100 can include a UE 110, at least one network entity 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

In existing NR specifications, PDSCH can be repeated by a configured number of repetitions and a single PDCCH can schedule the PDSCH. Although some embodiments discuss CSI computation and reporting for the case of PDSCH repetition via multiple PDCCH repetitions, some embodiments can also apply to the case that a PDCCH schedules a configured number of PDSCH repetitions. In some embodiments, instead of the term slot, the terms mini-slot or aggregated slots can be also used, where the notion of slot/mini-slot/aggregated slots can be described in Technical Specification (TS) 38.211/TS 38.213/TS 38.214. According to possible embodiments, A-CSI triggering can be done via DL assignment to save control resources in DL heavy traffic scenarios, to enable fast CSI reporting to be used for PDSCH retransmissions, and for other scenarios. At least some embodiments can include mechanisms to determine resources for CSI report computation, including CSI reference resource definition, and mechanisms to determine resources for CSI report transmission, including PUCCH resource determination.

For example, at least some embodiments can provide for resources for CSI report computation. If an aperiodic CSI report is triggered via a DL assignment, the resource used for CSI calculation, such as a CSI reference resource, can be indicated in the DL assignment or configured by higher layer signaling such as Radio Resource Control (RRC) or MAC layer signaling. The resource for CSI reporting calculation can be in the frequency domain, in the time domain, and/or in the spatial domain, such as when TRPs are used.

For CSI reference resource definition, according to TS 38.214, the CSI reference resource for a serving cell can be defined as follows. In the frequency domain, the CSI reference resource can be defined by the group of downlink physical resource blocks corresponding to the band to which the derived Channel Quality Indicator (CQI) value relates. In the time domain, the slot n' can be the slot the CSI report is sent on in the uplink. The CSI reference resource for a CSI reporting in uplink slot n' can be defined as a single downlink slot based on an offset number, nCQI_ref, of slots. For example, the CSI ref resource can be in slot n-nCQI_ref where n can be determined based on n', and n' can be the slot for the CSI reporting. nCQI_ref can be zero or can be determined based on the follow description.

$$n = \left\lfloor n' \cdot \frac{2^{\mu_{DL}}}{2^{\mu_{UL}}} \right\rfloor$$

and $\mu^{DL}$ and $\mu^{UL}$ can be the subcarrier spacing configurations for DL and UL, respectively, such as a scaling factor that can be one when $\mu^{DL}$ and $\mu^{UL}$ are equal.

For aperiodic CSI reporting, if the UE is indicated by the DCI to report CSI in the same slot as the CSI request, nCQI_ref can be such that the reference resource is in the same valid downlink slot as the corresponding CSI request, otherwise nCQI_ref can be the smallest value greater than or equal to $\lceil Z'/N_{symb}^{slot} \rceil$, such that slot nCQI_ref can correspond to a valid downlink slot, where Z' can correspond to the delay requirement as defined in Subclause 5.4 of TS 38.214 and $N_{symb}^{slot}$ can be the number of symbols in a slot.

The UE can derive, for each CQI value reported in uplink slot n', the highest CQI index that satisfies the following condition: A single PDSCH transport block with a combination of modulation scheme, target code, rate and transport block size corresponding to the CQI index, and occupying a group of downlink physical resource blocks termed the CSI reference resource, could be received with a transport block error probability not exceeding: 0.1, if the higher layer parameter cqi-Table in CSI-ReportConfig configures 'table 1' corresponding to Table 5.2.2.1-2, or 'table2' corresponding to Table 5.2.2.1-3 in TS 38.214, or 0.00001, if the higher layer parameter cqi-Table in CSI-ReportConfig configures 'table3' corresponding to Table 5.2.2.1-4 in TS 38.214.

A slot in a serving cell can be considered to be a valid downlink slot if it comprises at least one higher layer configured downlink or flexible symbol, and it does not fall within a configured measurement gap for that UE, and the active DL BWP in the slot is the same as the DL BWP for which the CSI reporting is performed, and there is at least one CSI-Reference Signal (RS) transmission occasion for channel measurement and CSI-RS and/or CSI-Interference Measurement (IM) occasion for interference measurement in Discontinuous Reception (DRX) Active Time no later than CSI reference resource for which the CSI reporting is performed. If there is no valid downlink slot for the CSI reference resource corresponding to a CSI report setting in a serving cell, CSI reporting can be omitted for the serving cell in uplink slot n'.

According to a possible embodiment, if PDCCH containing the DL assignment is repeated multiple times, such as in different symbols/min-slots/slots/TTIs, and if A-CSI is triggered via DL DCI carried on the repeated PDCCHs, and if the gNB does not know which PDCCH out of the repeated PDCCHs the UE has decoded, such as when PDSCH is transmitted four times, such as in four TTIs, and PDCCH is transmitted in the first TTI and third TTI of the four TTIs, then the CSI reference resource for a CSI reporting in uplink slot n' can be defined by a single downlink slot n-nCQI_ref according to one or more of the following approaches.

The CSI reference resource can be in the same slot as the slot containing the CSI request for the decoded PDCCH instance carrying DL DCI. In the example above, where PDCCH is transmitted in the first and third TTIs of the four TTIs, then based on which of the two PDCCHs the UE has decoded, the CSI reference resource can be the first TTI of the four TTIs or the third TTI of the four TTIs. The CSI reference resource can also be in the same slot as the slot containing the CSI request for the latest, such as the most recent, decoded PDCCH instance carrying DL DCI, such as if multiple PDCCHs of the same DCI are decoded, such as jointly or separately. This can provide a more recent channel estimate. Alternately, the CSI reference resource can also be in the same slot as the slot containing the CSI request for the earliest decoded PDCCH instance carrying DL DCI, such as if multiple PDCCHs of the same DCI are decoded, such as jointly or separately. This can give more time for CSI computation.

Alternately, nCQI_ref can be determined based on the decoded PDCCH instance carrying the common DL DCI and based on the number of PDSCH repetitions. For example, the decoded PDCCH instance can correspond to the first instance of PDSCH repetitions, where PDSCH can be repeated for a given number, x, of slots. In such a case, nCQI_ref can be determined to be the slot that is x-1 slots after the slot containing the CSI request. In another embodiment, the CSI reference resource can be determined based on, such as can be, the last instance of the PDSCH scheduled by a PDCCH, which can be sent in a TTI before the last instance of the PDSCH. In another embodiment, the CSI reference resource can be determined based on the latest, such as the most recent, PDSCH instance that resulted in successful decoding of the transport block corresponding to the PDSCH, such as in a case of early PDSCH termination in which not all the PDSCH repetitions are used.

According to a possible embodiment, if the UE is indicated by the DCL DCI to report CSI in a slot carrying a repeated PDSCH, nCQI_ref can be such that the reference resource is in the same valid downlink slot as the repeated PDSCH, such as in slot n+N PDSCH_Rep-2 and the CSI can be reported in the same slot. For example, the UE can be indicated by the DCL DCI to report CSI in a slot carrying a repeated PDSCH when number of PDSCH repetitions, N_PDSCH_Rep, indicated in the DL DCI, so slot n, n+1, . . . n+N_PDSCH_Rep-1 carry repeated PDSCH and the DL DCI in slot n carries the CSI request indicated to report CSI in slot n+N_PDSCH_Rep-2. Also, instead of slots, mini-slots or aggregated slots can be also be used.

According to a possible embodiment, when multiple PDSCH repetitions/transmissions of a Transport Block (TB) are scheduled via one or more PDCCH repetitions, if the DL DCI triggers A-CSI report, the DL DCI can also indicate nCQI_ref is such that the reference resource is in the same valid downlink slot as that of the downlink slots, mini-slots, and/or aggregated slots carrying the repeated PDSCHs. For example, if the PDCCH indicates k PDSCH transmissions, the DCI also can indicate a value from 0 to k-1. The value can indicate the slot/mini-slot/aggregated slot index within the PDSCH repetition window that nCQI_ref is such that the reference resource is in the same valid downlink slot/mini-slot/aggregated slot as indicated by the value.

According to a possible embodiment, the UE can be configured with a maximum number of PDSCH repetitions, such as N_PDSCH_Rep_Max, by higher layers, such as an RRC layer. The DL DCI in slot n can indicate the number of PDSCH repetitions, N_PDSCH_Rep. The value for nCQI_ref can be determined such that the CSI reference resource in the time-domain is the latest, such as the last, valid downlink slot in the window of N_PDSCH_Rep_Max slots, such as the candidate PDSCH repetition slots, such as in the window of slots n-N_PDSCH_Rep_Max+N_PDSCH_Rep, . . . n, n+1, n+N_PDSCH_Rep-1.

Figure 2:
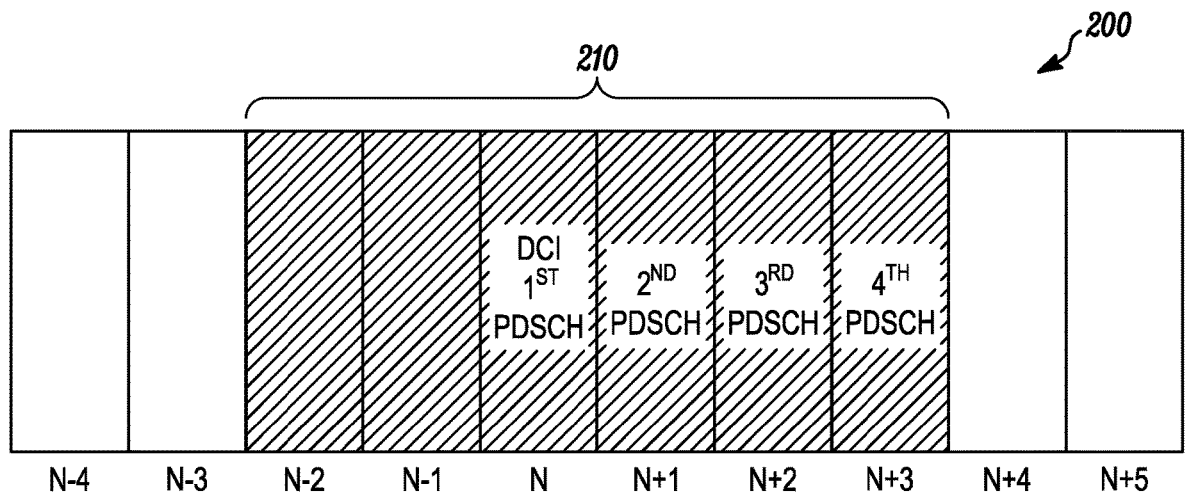
FIG. 2 is an example illustration of slots according to a possible embodiment.

FIG. 2 is an example illustration 200 of slots n-4 through n+5 according to a possible embodiment. The slots n-2 through n+3 can include a window 210 for a CSI reference resource. A PDSCH transmission in slot n can include a DCI that schedules four PDSCH transmissions in slots n through n+3. The DCI in slot n can also include an A-CSI trigger. The window 210 can be determined based on the slot n in which the DCI is received, based on N_PDSCH_Rep_Max, and based on N_PDSCH_Rep. For example, in the illustration 200, N_PDSCH_Rep_Max=6 and N_PDSCH_Rep=4. The CSI reference resource can be the latest downlink slot in the window 210.

According to another possible embodiment, instead of having a single downlink slot nCQI_ref, multiple downlink slots can be used as CSI reference resources, and CSI calculation over those slots or a function of the CSI calculation for each of those slots can be considered as the resulting CSI. For example, the first and last slots of the corresponding PDSCH can be considered as CSI reference resources to calculate the CSI, where CSI derivation can include the highest CQI index that satisfies the following condition: A single PDSCH transport block with a combination of modulation scheme, target code rate and transport block size corresponding to the CQI index, and occupying a group of downlink physical resource blocks over the CSI reference resources, could be received with a transport block error probability not exceeding a reliability target (e.g., 0.00001 or 1e-6), if the higher layer parameter cqi-Table in CSI-ReportConfig configures 'tableX', such as table3 corresponding to Table 5.2.2.1-4 of 38.214.

The number of DL slots to use as CSI reference resource(s) can be specified in 3GPP specifications, such as a function of PDSCH repetition number. The number of DL slots to use as CSI reference resource(s) can also be a UE capability. The number of DL slots to use as CSI reference resource(s) can also be signaled via physical signaling, such as in the PDCCH triggering the A-CSI. The number of DL slots to use as CSI reference resource(s) can also be signaled via higher layer signaling, such as RRC or MAC layer signaling. For example, the number of CSI reference resources can be signaled in the PDCCH triggering the A-CSI to be one or more based on gNB's understanding or estimate/prediction of a number of time-domain repetitions needed for future DL URLLC traffic data packets with a certain reliability.

In a case of multiple CSI reference resources, if at least a DL slot corresponding to one of the CSI reference resources is a valid downlink slot, all the determined CSI reference resources can be used to calculate CSI. For example, all the corresponding DL slots can be considered to be virtually valid.

According to a possible embodiment, if the DL DCI triggers the A-CSI report for URLLC or the DL DCI triggers the CSI report to be transmitted on the PUCCH resources allocated to URLLC operation, and the DL DCI schedules PDSCH of non-URLLC or URLLC has a notably different reliability target, then the UL slot duration above can be different than DL slot duration of the DL.

According to a possible embodiment, the PDCCH can be repeated multiple times, such as in different symbols/min-slots/slots/TTIs, with the A-CSI report request, and, as the gNB may have no knowledge of which PDCCH of the repeated PDCCH the UE will receive, the UE can be expected to receive more than one DCI with non-zero CSI request, such as triggering a CSI, per slot, such as in a case of PDCCH repetition in different symbols/min-slots within a slot. In this case the UE can be a UE supporting PDCCH/PDSCH repetition reception capability.

In a case of aperiodic CSI-RS, the UE can be expected to receive aperiodic CSI-RS transmitted in the slot before the OFDM symbol(s) carrying a repeated PDCCH with a triggering DCI, such as the A-CSI report request, in the slot. The repeated PDCCH can trigger CSI reporting in the same uplink slot n', such as to save uplink resources, so the UE can be expected to receive more than one aperiodic CSI report request for transmission of the same aperiodic CSI report in a given slot. The UE can expect that the CSI triggering state or the codepoint indicated in the CSI request field in the different repeated PDCCH are consistent, such as the same, if the UE decodes multiple repeated PDCCH.

When aperiodic CSI-RS is used with aperiodic reporting, the CSI-RS offset can be configured per resource set by the higher layer parameter aperiodicTriggeringOffset. The CSI-RS triggering offset can have the range of 0 to 4 slots. In one example, with repeated PDCCH, the DCI can further include an additional CSI-RS offset term that is applied in addition to the CSI-RS offset corresponding to the higher layer parameter aperiodic TriggeringOffset. The additional CSI-RS offset in the DCI can be common to all the CSI resource sets. According to a possible implementation, the additional CSI-RS triggering offset can have a range of −4 to 0 slots. The additional CSI-RS triggering offset can enable indication of the same slot containing the aperiodic CSI-RS in the repeated PDCCH in different slots. The additional CSI-RS triggering offset can be a bit field in the DCI or can be jointly coded with another bit field in the DCI. In one example, the presence of additional CSI-RS triggering offset in the PDCCH DCI can be configured by higher layers. In one example, when the UE is configured to receive PDSCH repetition with potential PDCCH repetition, such as PDSCH repetition indicated in DCI, the UE may not be expected to be configured with aperiodic CSI-RS for aperiodic CSI reporting or may not be expected to be triggered to report aperiodic CSI associated to a CSI resource set with a aperiodic CSI-RS resource.

At least some embodiments can provide resources for CSI report transmission. For example, if aperiodic CSI report is triggered via a DL assignment, the resource for CSI reporting transmission can be indicated in the DL assignment and/or configured by higher layer signaling, such as RRC or MAC signaling. The resource for CSI reporting transmission can be in frequency, time, and/or spatial, such as which TRP is used, domains.

According to a possible embodiment, the network can configure PUCCH resources by higher layer signaling, and the UE, upon reception of DL DCI, can determine the PUCCH resource for transmitting the triggered CSI report. According to a possible implementation, the PUCCH resource can be different than PUCCH resources that can be used for Hybrid Automatic Repeat Request-Acknowledgement (HARQ-ACK) transmission corresponding to the scheduled PDSCH via the DL DCI. For example, using the PUCCH resource that is different than PUCCH resources used for HARQ-ACK transmission can be used to provide higher reliability, which can be required for URLLC operation, in case the DL DCI is intended for non-URLLC service, such as Enhanced Mobile Broadband (eMBB). According to another possible implementation, the PUCCH resource can be the same as the PUCCH resources that can be used for HARQ-ACK transmission. For example, this can be used if the DL DCI is intended for URLLC service of the same/similar reliability as the one targeted for CSI reporting. In another example, the CSI and HARQ-ACK can be multiplexed such that the reliability of the corresponding Uplink Control Information (UCI) communications can be maintained. For example, separate coding for CSI and HARQ-ACK can be multiplexed on REs corresponding to the PUCCH resource.

According to another possible embodiment, the resource, such as the PUCCH resource, to convey the CSI report that was triggered via a DL DCI can be determined based on the DCI format or a Radio Network Temporary Identifier (RNTI) associated with the DL DCI and/or can be determined based on a determined UL BWP. The UL BWP can be determined via the DL DCI and/or via a higher layer signaling such as a MAC CE, or RRC. For example, an UL BWP can be RRC configured for some DCI formats including the one that carries URLLC data. As a further example, if the UE supports active BWP change via DCI, the DL DCI can have a field indicating the UL BWP for the PUCCH resource to be used for A-CSI trigger corresponding to URLLC. The UL BWP can be also be determined similar to the determination of the UL BWP for HARQ-ACK transmission. For example, the UL BWP for PUCCH transmission can be the active BWP. As another example, when the UE is configured with CSI Reporting on some PUCCH formats, such as PUCCH formats 2, 3 or 4, each PUCCH resource can be configured for each candidate UL BWP.

According to a possible embodiment, the CSI report triggered by a DL DCI and transmitted on a PUCCH can have at most a certain size, which can also be referred to as CSI report on PUCCH threshold size, such as CSI_PUCCH_Size. The maximum CSI report size, CSI_PUCCH_Size, can be a function of the configured PUCCH, such as a PUCCH format.

According to a possible embodiment, if PDCCH containing the DL assignment is repeated multiple times, such as in different symbols/min-slots/slots/TTIs, if the PDCCHs schedule multiple PDSCH repetitions, such as similar to the scheduling of repeated PDSCHs in LTE-HRLLC as described in above embodiments, and if A-CSI is triggered via DL DCI carried on the repeated PDCCHs, then the UE can determine the PUCCH resource according to one or more of the following approaches.

According to a possible approach, the UE can determine a PUCCH resource corresponding to each PDCCH or the PDCCH it decodes successfully. For example, if the PDSCH is transmitted four times, such as in four TTIs, and the PDCCH is transmitted in the first TTI and third TTI of the four TTIs, then a first PUCCH resource can be determined if the UE has decoded the first PDCCH and a second PUCCH resource can be determined if the UE has decoded the second PDCCH. According to a possible implementation, the UE can use the earliest determined PUCCH resource to convey the triggered CSI report. This can provide a faster CSI report to the network. According to another possible implementation, the UE can use the earliest determined PUCCH resource that has provided enough CSI processing time for the UE to generate and transmit the CSI report. This can provide a faster CSI report to the network, yet can give sufficient processing time to the UE. According to another possible implementation, the UE can determine a PUCCH resource out of the available PUCCH resources, such as out of the determined PUCCH resources, according to the CSI report format, such as according to the higher layer parameter reportQuantity as defined in TS 38.331 and used in TS 38.214. According to another possible implementation, the UE can repeat/distribute the CSI over all or a subset of determined PUCCH resources. According to another possible implementation, the UE can use a first subset of determined PUCCH resources to convey a previously pending CSI report, such as a triggered A-CSI report and a second subset of determined PUCCH resources to convey the currently triggered A-C I report.

According to another possible approach, the UE can determine a PUCCH resource irrespective of which PDCCH the UE has decoded. In a possible implementation, the PUCCH resource can be determined according to the last instance of the repeated PDSCH scheduled by the PDCCHs.

According to another possible approach, the UE can determine a PUCCH resource according to the latest PDSCH instance that resulted in successful decoding of the transport block corresponding to the PDSCH, such as in a case of early PDSCH termination in which not all the PDSCH repetitions are used for PDSCH decoding. For this case, a gNB can assign a PUCCH resource for every possible termination of PDSCH decoding, such as every possible repetition of PDSCH.

According to a possible embodiment, the UE can transmit the CSI report on a determined PUCCH resource irrespective of whether the PDSCH is successfully decoded. According to a possible example, HARQ-ACK can be multiplexed with CSI and transmitted on the determined PUCCH resource for CSI.

According to at least some possible embodiments, according to TS 38.213 if a BWP indicator field is configured in DCI format 1_1, the BWP indicator field value can indicate the active DL BWP, from the configured DL BWP set, for DL receptions. If a bandwidth part indicator field is configured in DCI format 0_1, the bandwidth part indicator field value can indicate the active UL BWP, from the configured UL BWP set, for UL transmissions. If a bandwidth part indicator field is configured in DCI format 0_1 or DCI format 1_1 and indicates an UL BWP or a DL BWP different from the active UL BWP or DL BWP, respectively, for each information field in the received DCI format 0_1 or DCI format 1_1, if the size of the information field is smaller than the one required for the DCI format 0_1 or DCI format 1_1 interpretation for the UL BWP or DL BWP that is indicated by the bandwidth part indicator, respectively, the UE can prepend zeros to the information field until its size is the one required for the interpretation of the information field for the UL BWP or DL BWP prior to interpreting the DCI format 0_1 or DCI format 1_1 information fields, respectively; and/or if the size of the information field is larger than the one required for the DCI format 0_1 or DCI format 1_1 interpretation for the UL BWP or DL BWP that is indicated by the bandwidth part indicator, respectively, the UE can use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively; and the UE can set the active UL BWP or DL BWP to the UL BWP or DL BWP indicated by the bandwidth part indicator in the DCI format 0_1 or DCI format 1_1, respectively.

According to TS 38.214, when the UE is configured with CSI Reporting on PUCCH formats 2, 3 or 4, each PUCCH resource can be configured for each candidate UL BWP. According to TS 38.213, for each UL BWP in a set of UL BWPs, the UE can be configured resource sets for PUCCH transmissions as described in Subclause 9.2.

If the UE is in an active semi-persistent CSI reporting configuration on PUCCH, and has not received a deactivation command, the CSI reporting can take place when the BWP in which the reporting is configured to take place is the active BWP. Otherwise the CSI reporting can be suspended.

According to a possible embodiment, if the PDCCH containing the DL assignment is repeated multiple times, such as in different symbols/min-slots/slots/TTIs, if A-CSI is triggered via DL DCI carried on the repeated PDCCH, if the gNB doesn't know which PDCCH out of the repeated PDCCHs the UE has decoded, and if the UE does not have enough processing time to generate CSI reports or depending on which PDCCH it decodes, the UE can drop/suspend some of the CSI reports, such as the recently triggered CSI report(s).

Figure 3:
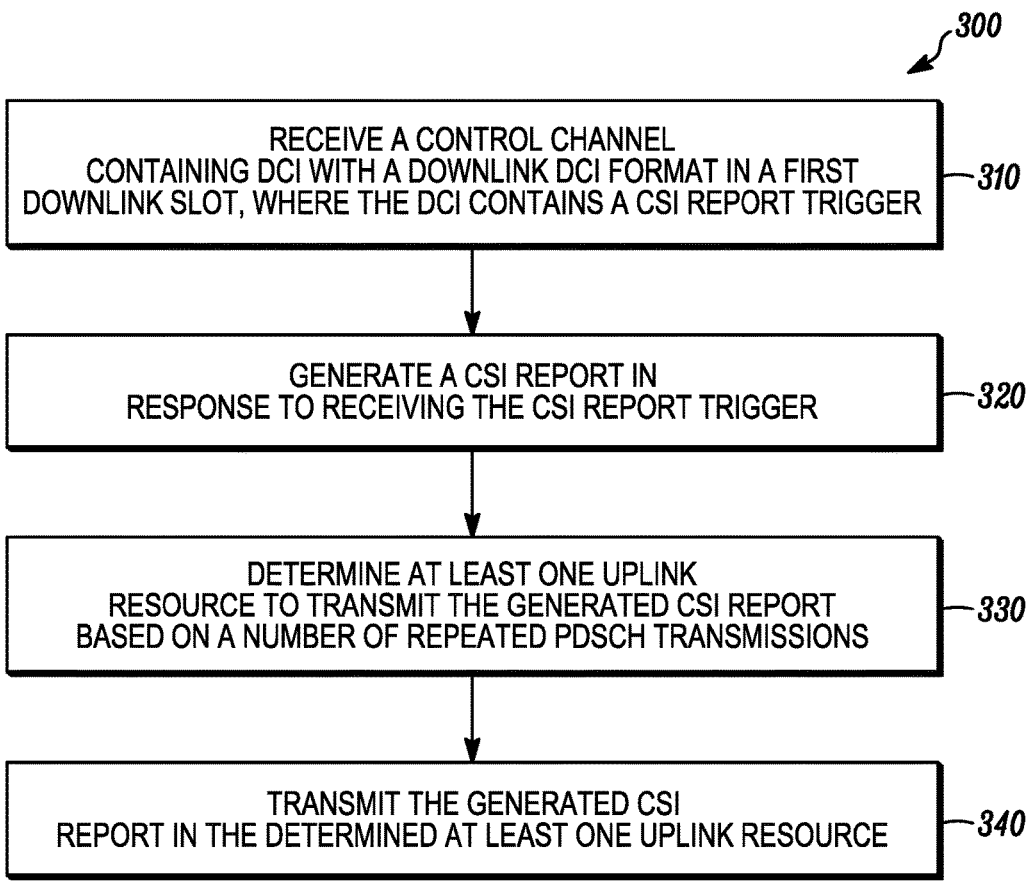
FIG. 3 is an example flowchart illustrating the operation of an apparatus according to a possible embodiment.

FIG. 3 is an example flowchart 300 illustrating the operation of a wireless communication device, such as the UE 110, according to a possible embodiment. At 310, a control channel can be received in a first downlink slot. The control channel can contain DCI with a downlink DCI format. The DCI can contain a CSI report trigger that triggers a CSI report. The DCI can schedule PDSCH transmissions repeated a number, k, of times in a set of downlink slots. Each PDSCH transmission of the repeated PDSCH transmissions can be in a separate downlink slot.

At 320, a CSI report can be generated in response to receiving the CSI report trigger. The generated CSI report can have a size smaller than a threshold size. For example, according to a possible embodiment, the CSI report triggered by a DL DCI and transmitted on a PUCCH can have at most a certain size, which can also be referred to as CSI report on PUCCH threshold size, such as a CSI_PUCCH_Size. The maximum CSI report size can be a function of the configured PUCCH, such as function of a format of the configured PUCCH.

According to a possible embodiment, at least one CSI reference resource comprising at least one time-domain resource and at least one frequency-domain resource can be determined based on the received control channel. A determination can be made as to which CSI reference resources of the at least one CSI reference resource are in valid downlink slots. The CSI report can be generated based on measurements associated with the determined CSI reference resources that are in valid downlink slots. A downlink slot can include OFDM symbols used for DL operation.

According to a possible implementation, the at least one CSI reference resource can be determined based on the received control channel by being based on the number, k, of repeated PDSCH transmissions and based on attributes of the CSI report. According to a possible implementation, the at least one CSI reference resource can include only one CSI reference resource and the CSI reference resource can be determined to be the same slot as the first downlink slot. According to a possible implementation, the at least one CSI reference resource can include only one CSI reference resource and the CSI reference resource can be determined to be a most recent slot including an instance of a PDSCH of the repeated PDSCH that is in a valid downlink slot. According to a possible implementation, the at least one CSI reference resource can include only one CSI reference resource and the CSI reference resource can be determined to be a most recent slot including an instance of a PDSCH of the repeated PDSCH that resulted in successful decoding of the transport block in the repeated PDSCH and that is in a valid downlink slot.

At 330, at least one uplink resource to transmit the generated CSI report can be determined. The at least one uplink resource can be determined based on the number, k, of repeated PDSCH transmissions. The at least one uplink resource can be determined based on the first downlink slot index and/or first downlink slot timing. The at least one uplink resource can be a set of uplink resources.

Determining the at least one uplink resource can include determining at least two PUCCH resource candidates. The first PUCCH resource candidate can be determined based on a second downlink slot. The second downlink slot can be in the set of downlink slots. The first downlink slot can also be part of the set of downlink slots. The second PUCCH resource candidate can be determined based on a third downlink slot. The third downlink slot can be in the set of downlink slots. Determining the at least one uplink resource can also include selecting one of the first PUCCH resource candidate or the second PUCCH resource candidate as an uplink resource based on at least one selection criterion.

For example, a UE can determine a PUCCH resource as the uplink resource corresponding to each PDCCH or corresponding to the PDCCH it decodes successfully. As a further example, according to a possible approach, the UE can determine a PUCCH resource corresponding to each PDCCH or corresponding to the PDCCH it decodes successfully. If the PDSCH is transmitted four times, such as in in four TTIs, and the PDCCH is transmitted in the first TTI and third TTI of the four TTIs, then a first PUCCH resource can be determined to be the uplink resource if the UE has decoded the first PDCCH and a second PUCCH resource can be determined to be the uplink resource if the UE has decoded the second PDCCH.

The at least one selection criterion can be to select between the first PUCCH resource candidate and the second PUCCH resource candidate for the earliest determined PUCCH resource candidate that occurs earlier than the other determined PUCCH resource candidate. For example, according to a possible implementation, the UE can use the earliest determined PUCCH resource to convey the triggered CSI report. This can provide a faster CSI report to the network. The at least one selection criterion can also be to select the PUCCH resource candidate that is associated with a downlink slot that is the same downlink slot as a most recent PDSCH repetition. For example, the latest PDSCH repetition can be the $k^{th}$ PDSCH transmission, such as the latest PDSCH repetition. The at least one selection criterion can also be to select the PUCCH resource candidate that is associated with a downlink slot that is the same downlink slot as the latest PDSCH repetition that resulted in successful decoding of a transport block corresponding to the PDSCH.

According to a possible embodiment, the at least one uplink resource for transmitting the CSI report can be further be determined based on attributes of the CSI report. Attributes can include a CSI report format. The at least one uplink resource can also be determined based on which TRP is used for communication.

According to a possible embodiment, an uplink PUCCH resource for HARQ-ACK feedback corresponding to DL data transmissions can be determined. Determining the at least one uplink resource can include determining an uplink PUCCH resource to transmit the generated CSI report. The uplink PUCCH resource can be determined to be the same resource as the uplink PUCCH resource determined for HARQ-ACK feedback corresponding to the DL data transmissions. For example, according to a possible embodiment, the network can configure PUCCH resources by higher layer signaling, and the UE, upon reception of DL DCI, can determine the PUCCH resource for transmitting the triggered CSI report. According to a possible implementation, the PUCCH resource can be the same as the PUCCH resources that can be used for HARQ-ACK transmission. For example, this can be used if the DL DCI is intended for URLLC service of the same/similar reliability as the one targeted for CSI reporting.

According to a possible embodiment, an uplink PUCCH resource for HARQ-ACK feedback associated with the DL data transmissions can be determined. Determining the at least one uplink resource can include determining an uplink PUCCH resource to transmit the generated CSI report, where the uplink PUCCH resource to transmit the generated CSI report is determined to be different from the uplink PUCCH resource determined for HARQ-ACK feedback associated with the DL data transmissions. For example, according to a possible implementation, the PUCCH resource can be different than PUCCH resources that can be used for HARQ-ACK transmission corresponding to the scheduled PDSCH via the DL DCI. This can provide higher reliability, which can be required for URLLC operation, in case the DL DCI is intended for non-URLLC service, such as Enhanced Mobile Broadband (eMBB).

At 340, the generated CSI report can be transmitted in the determined at least one uplink resource. For example, the generated CSI report can be transmitted in a selected PUCCH resource candidate. According to a possible embodiment, the generated CSI report can be transmitted in the determined uplink PUCCH resource. According to a possible embodiment, the HARQ-ACK feedback associated with the DL data transmissions can be multiplexed with the generated CSI report and the HARQ-ACK feedback can be transmitted on the uplink PUCCH resource. For example, the HARQ-ACK can be sent on the PUCCH resource corresponding to the CSI report. In one example, the HARQ-ACK can be multiplexed with CSI and transmitted on the determined PUCCH resource for CSI. According to a possible implementation, the generated CSI report and the HARQ-ACK feedback associated with the DL data transmissions can be multiplexed based on maintaining reliability of UCI communications corresponding to the generated CSI report and the HARQ-ACK feedback. For example, separate coding for CSI and HARQ-ACK can be multiplexed on REs corresponding to the PUCCH resource.

Figure 4:
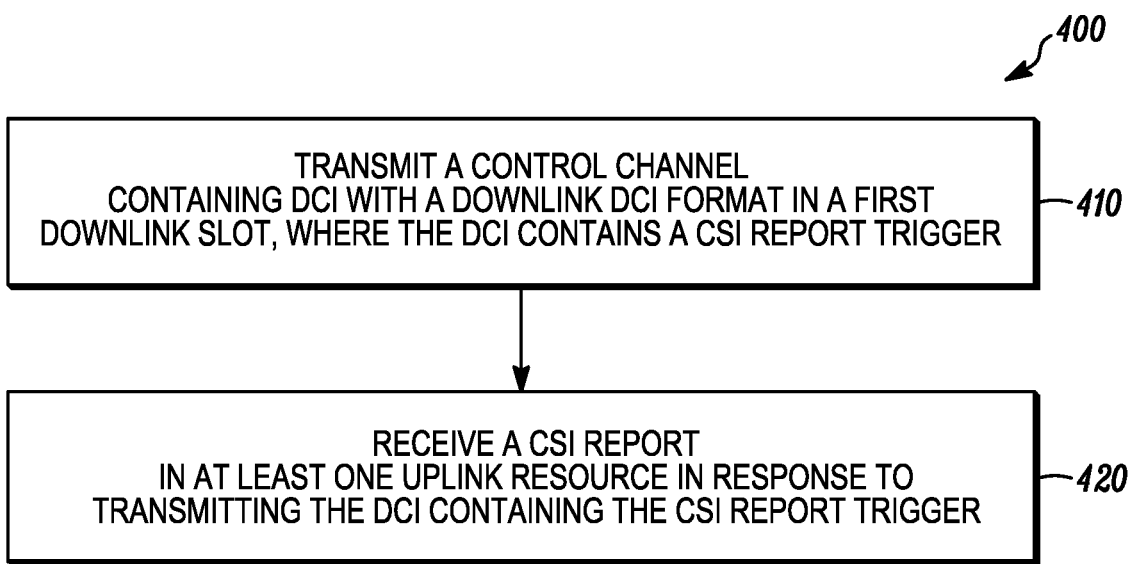
FIG. 4 is an example flowchart illustrating the operation of an apparatus according to a possible embodiment.

FIG. 4 is an example flowchart 400 illustrating the operation of a wireless communication device, such as the network entity 120, according to a possible embodiment. At 410, a control channel containing DCI with a downlink DCI format can be transmitted in a first downlink slot. The DCI can contain a CSI report trigger that triggers a CSI report. The DCI can schedule PDSCH transmissions repeated a number of times in a set of downlink slots. Each PDSCH transmission of the repeated PDSCH transmissions can be in a separate downlink slot. At 420, a CSI report can be received in at least one uplink resource in response to transmitting the DCI containing the CSI report trigger. The at least one uplink resource can be determined, such as at a UE, based on the number of repeated PDSCH transmissions. Other operations of other embodiments can also be performed, such as reciprocal operations with respect to UE operations.

Figure 5:
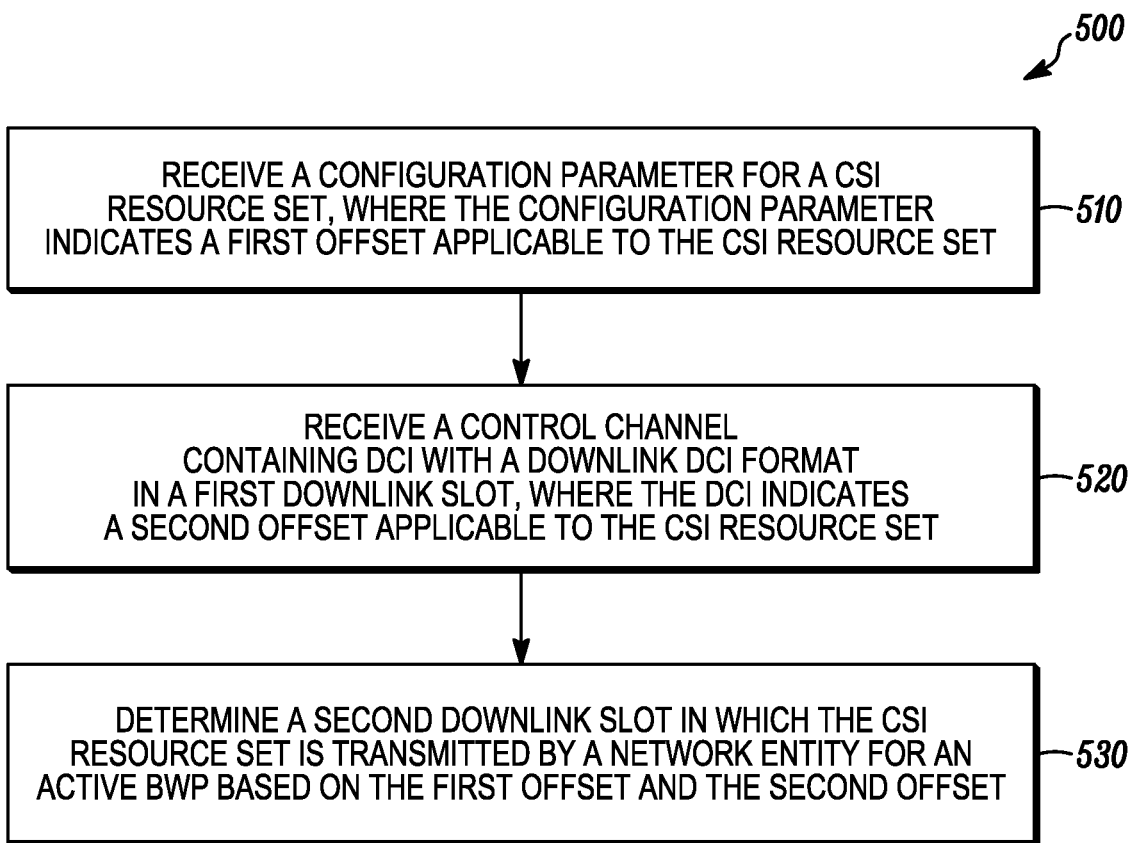
FIG. 5 is an example flowchart illustrating the operation of an apparatus according to a possible embodiment.

FIG. 5 is an example flowchart 500 illustrating the operation of a wireless communication device, such as the UE 110, according to a possible embodiment. At 510, a configuration parameter for a CSI resource set can be received. The CSI resource set can have an aperiodic CSI-RS resource. The CSI resource set can be a set of CSI-RS. The CSI resource set can be different than a CSI reference resource. The configuration parameter can indicate a first offset applicable to the CSI resource set. The configuration parameter can be a higher layer configuration parameter that is received on a layer higher than the physical layer. The first offset can be based on the higher layer configuration parameter, aperiodicTriggeringOffset. For example, when aperiodic CSI-RS is used with aperiodic reporting, the CSI-RS offset can be configured per resource set by the higher layer parameter aperiodicTriggeringOffset. The CSI-RS triggering offset can have a range of 0 to 4 slots. In one example, with repeated PDCCH, the DCI can further include an additional CSI-RS offset term that is applied in addition to the CSI-RS offset corresponding to the higher layer parameter aperiodicTriggeringOffset. Furthermore, as understood to one of ordinary skill in the art and as defined in TS 38.331 V15.3.0, an aperiodicTriggeringOffset can be an integer and can be an offset of a number of slots, x, between the slot containing the DCI that triggers a set of aperiodic CSI-RS resources and the slot in which the CSI-RS resource set is transmitted. When the field is absent a UE can apply a value of zero.

At 520, a control channel can be received. The control channel can contain DCI with a downlink DCI format in a first downlink slot. The DCI can indicate a second offset applicable to the CSI resource set. The second offset can be applicable to all of a plurality of CSI resource sets including the CSI resource set. For example, as described above, the additional CSI-RS offset in the DCI can be common to all the CSI resource sets. The second offset can be a range of −4 to 0 slots or any other useful range. For example, a DCI additional CSI-RS offset can have a range of −4 to 0 slots, which can enable the slot containing the CSI reference resource to be the same slot as the DCI that triggered the CSI report. The second offset may or may not be jointly coded with another bit field in the DCI.

According to a possible embodiment, a higher layer message can be received on a layer higher than a physical layer. The higher layer message can indicate a presence of a bit field in the DCI indicating the second offset. For example, the second offset, such as an additional CSI-RS triggering offset, can be a bit field in the DCI or jointly coded with another bit field in the DCI. As a further example, the presence of an additional CSI-RS triggering offset in the PDCCH DCI can be configured by higher layers.

At 530, a second downlink slot in which the CSI resource set is transmitted by a network entity for an active BWP can be determined based on the first offset and the second offset. For example, an offset applicable to the CSI resource set for an active BWP can be determined based on the first offset and the second offset. If the UE is in an active semi-persistent CSI reporting configuration on PUCCH, and has not received a deactivation command, the CSI reporting can take place when the BWP in which the reporting is configured to take place is the active BWP, otherwise the CSI reporting can be suspended.

According to a possible embodiment, the DCI can be first DCI. Second DCI can be received in a third downlink slot. The second DCI can include an aperiodic CSI request. The second DCI that contains the aperiodic CSI request and the first DCI indicating the second offset can be the same DCI. The first DCI and the second DCI can also be in different DCI. The aperiodic CSI request can trigger performing aperiodic CSI reporting using the CSI resource set. For example, as described above, when aperiodic CSI-RS is used with aperiodic reporting, the CSI-RS offset can be configured per resource set by the higher layer parameter aperiodicTriggeringOffset.

The third downlink slot containing the second DCI can be before the second slot downlink slot including the CSI resource set. A time gap between the third downlink slot containing the second DCI and the second downlink slot in which the CSI resource set is transmitted by the network entity can be based on the first offset and the second offset. The CSI resource set can be received in the determined second downlink slot. A CSI report can be generated based on the received CSI resource set in response to receiving the aperiodic CSI request. The measurements for generating the CSI report can be done based on the CSI resource set, such as by using an interpolating/extrapolating function, or otherwise based on the CSI resource set.

According to a possible embodiment, a second DCI can be received. The second DCI can include an aperiodic CSI request in a third downlink slot. The second downlink slot containing the CSI resource set can be determined to be in a same slot as the third downlink slot containing the second DCI including the aperiodic CSI request.

As discussed above, the PDCCH can be repeated multiple times, such as in different symbols/min-slots/slots/TTIs, with an A-CSI report request. For example, the aperiodic CSI request can be transmitted by a network entity on multiple different PDCCHs. Each of the multiple different PDCCHs can be transmitted in different slots. The aperiodic CSI request can be received in at least one of the multiple different PDCCHs a CSI report can be generated based on the measurements of the CSI resource set in response to receiving the aperiodic CSI request.

The additional CSI-RS triggering offset can enable the indication of the same slot containing the aperiodic CSI-RS by the PDCCH repeated in different slots. For example, when the PDCCH is repeated in different slots, the repeated PDCCHs can include different offsets to indicate the same slot used for the aperiodic CSI-RS. Thus, the value of the second offset, such as the additional CSI-RS triggering offset, in the different PDCCHs can be relative to the slot of the each PDCCH in which the offset is received to be able to indicate the same slot containing the aperiodic CSI-RS. For example, a PDCCH including a CSI reporting trigger received in one slot can indicate an offset of zero slots and a PDCCH including the same CSI reporting trigger received in the next slot can indicate an offset of negative one slot such that both offsets can indicate the same slot used for the aperiodic CSI-RS.

According to a possible embodiment, the DCI can be a first DCI. The first DCI can indicate an aperiodic CSI request. A second DCI can be received in a third downlink slot. The second DCI can indicate the aperiodic CSI request and a third offset applicable to the CSI resource set. The first downlink slot and the third downlink slot can be different. The second offset and the third offset can be different. The third slot can occur before the second slot. For example, the additional CSI-RS triggering offset can enable indicating of the same slot containing the aperiodic CSI-RS for the PDCCH repeated in different slots. The PDCCH can be repeated multiple times with the A-CSI report request. A fourth downlink slot in which the CSI resource set is transmitted can be determined based on the first offset and the third offset. The second downlink slot containing the CSI resource set and the fourth downlink slot containing the CSI resource set can be the same. A CSI report can be generated based on the measurements of the CSI resource set in response to receiving the aperiodic CSI request.

Figure 6:
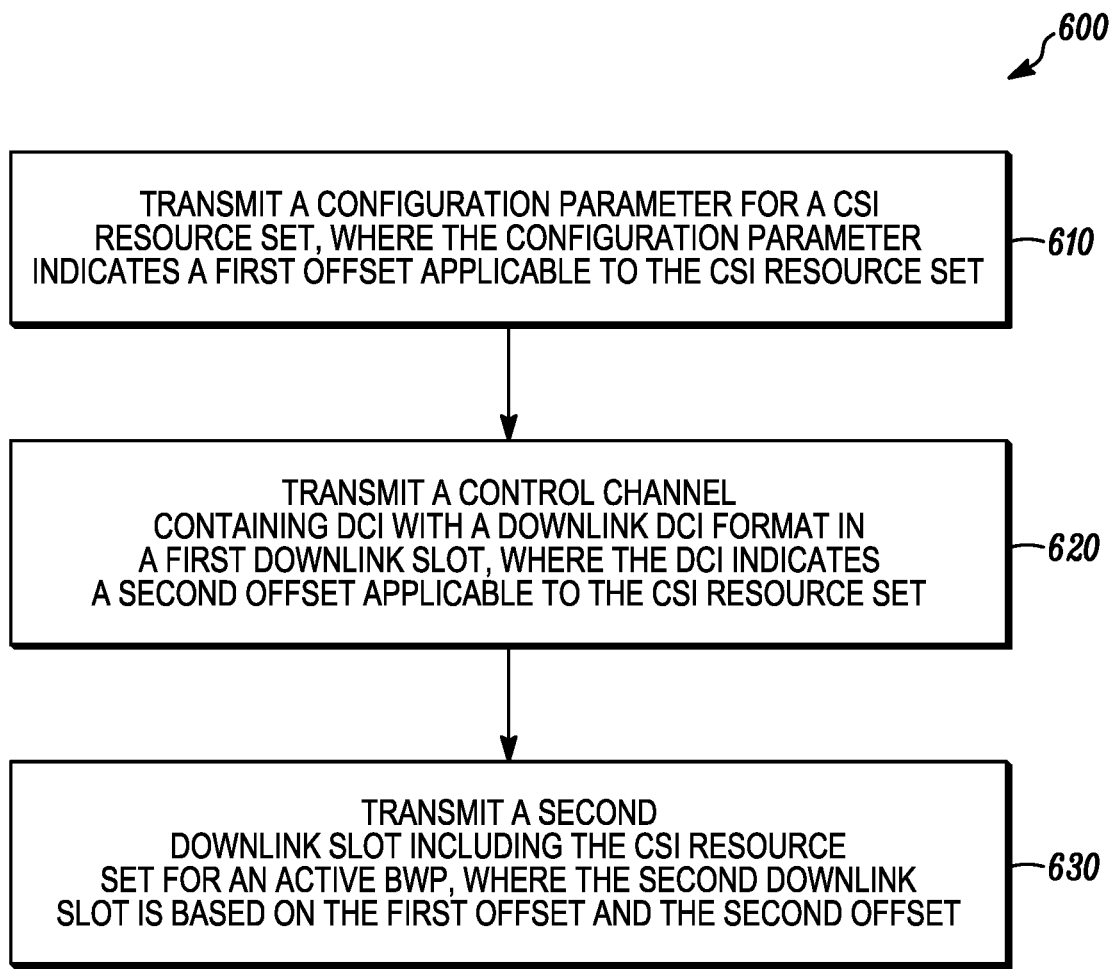
FIG. 6 is an example flowchart illustrating the operation of an apparatus according to a possible embodiment.

FIG. 6 is an example flowchart 600 illustrating the operation of a wireless communication device, such as the network entity 120, according to a possible embodiment. At 610, a configuration parameter for a CSI resource set can be transmitted. The configuration parameter can indicate a first offset applicable to the CSI resource set. The first offset can be in a range of 0 to 4 slots or any other useful range.

At 620, a control channel containing DCI with a downlink DCI format can be transmitted in a first downlink slot. The DCI can indicate a second offset applicable to the CSI resource set. The second offset can be applicable to all of a plurality of CSI resource sets including the CSI resource set. The second offset can be in a range of −4 to 0 slots or any other useful range. According to a possible embodiment, a higher layer configuration message can be sent that configures a presence of a bit field in the DCI indicating the second offset.

At 630, a second downlink slot including the CSI resource set for an active BWP can be transmitted. The second downlink slot can be based on the first offset and the second offset. Embodiments can also include generating the configuration parameter, generating the DCI, and generating and/or determining other information and signals that are transmitted from the network entity.

According to a possible embodiment, the DCI can be first DCI. Second DCI can be transmitted in a third downlink slot. The second DCI can include an aperiodic CSI request. The second DCI that contains the aperiodic CSI request and the first DCI indicating the second offset can be the same DCI. A time gap between the third downlink slot containing the second DCI and the second downlink slot in which the CSI resource set is transmitted can be based on the first offset and the second offset.

According to a possible embodiment, an aperiodic CSI request can be transmitted. The aperiodic CSI request can trigger performing aperiodic CSI reporting using the CSI resource set. The CSI resource set can be transmitted in the determined second downlink slot. A CSI report can be received. The CSI report can be based on the transmitted CSI resource set and can be received in response to transmitting the aperiodic CSI request.

According to a possible embodiment, a second DCI including an aperiodic CSI request can be transmitted in a third downlink slot. The second downlink slot containing the CSI resource set can be determined to be in a same slot as the third downlink slot containing the second DCI including the aperiodic CSI request.

According to a possible embodiment, the DCI can be first DCI. The first DCI can indicate an aperiodic CSI request. A second DCI can be transmitted in a third downlink slot. The first downlink slot and the third downlink slot can be different. The second DCI can indicate the aperiodic CSI request and a third offset applicable to the CSI resource set. The second offset and the third offset can be different. The CSI resource set can be transmitted in a fourth downlink slot based on the first offset and the third offset. The second downlink slot containing the CSI resource set and the fourth downlink slot containing the CSI resource set can be the same. A CSI report based on the measurements of the CSI resource set can be received in response to transmitting the aperiodic CSI request.

According to a possible embodiment, an aperiodic CSI request can be transmitted on multiple different PDCCH. Each of the multiple PDCCH can be transmitted in different slots. Each of the multiple PDCCH can include the same aperiodic CSI request. A CSI report based on measurements of the CSI resource set can be received in response to transmitting the aperiodic CSI request.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
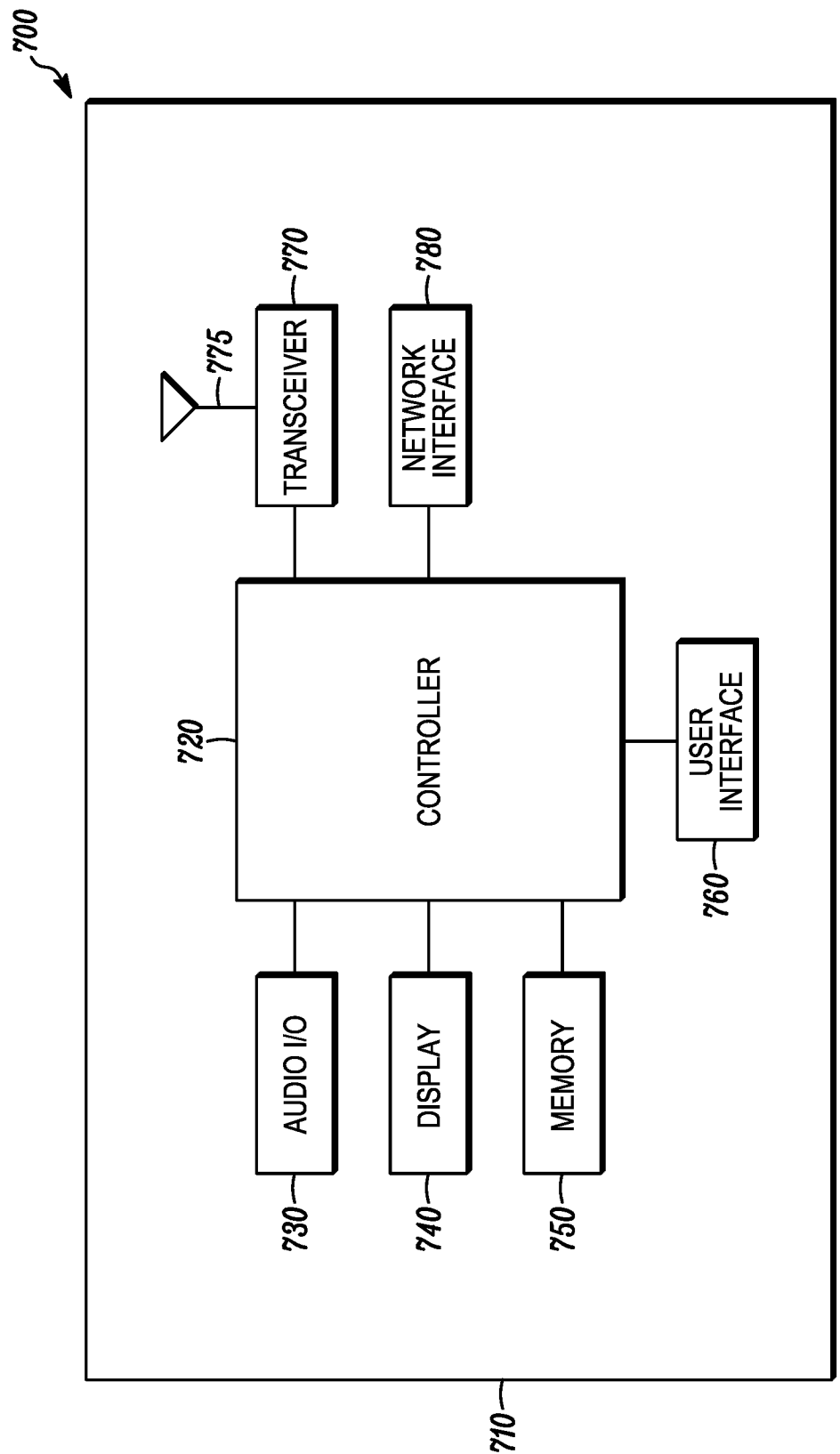
FIG. 7 is an example block diagram of an apparatus according to a possible embodiment.

FIG. 7 is an example block diagram of an apparatus 700, such as the UE 110, the network entity 120, or any other wireless communication device disclosed herein, according to a possible embodiment. The apparatus 700 can include a housing 710, a controller 720 coupled to the housing 710, audio input and output circuitry 730 coupled to the controller 720, a display 740 coupled to the controller 720, a memory 750 coupled to the controller 720, a user interface 760 coupled to the controller 720, a transceiver 770 coupled to the controller 720, at least one antenna 775 coupled to the transceiver 770, and a network interface 780 coupled to the controller 720. The apparatus 700 may not necessarily include all of the illustrated elements for different embodiments of the present disclosure. The apparatus 700 can perform the methods described in all the embodiments.

The display 740 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 770 can be one or more transceivers that can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 750 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 700 or the controller 720 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 750, elsewhere on the apparatus 700, in cloud storage, and/or anywhere else that can store software and/or an operating system. The apparatus 700 or the controller 720 may also use hardware to implement disclosed operations. For example, the controller 720 may be any programmable processor. Furthermore, the controller 720 may perform some or all of the disclosed operations. For example, some operations can be performed using cloud computing and the controller 720 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

In operation, the apparatus 700 can perform the methods and operations of the disclosed embodiments. The transceiver 770 can transmit and receive signals, including control signals and data signals and including information, such as control and data information. The controller 720 can generate and process the transmitted and received signals and information.

In operation as a UE according to a possible embodiment, the transceiver 770 can receive a control channel containing DCI with a downlink DCI format in a first downlink slot. The DCI can contain a CSI report trigger that triggers a CSI report. The DCI can schedule PDSCH transmissions repeated a number of times in a set of downlink slots. Each PDSCH transmission of the repeated PDSCH transmissions can be in a separate downlink slot. The controller 720 can generate a CSI report in response to receiving the CSI report trigger. The controller 720 can determine at least one uplink resource to transmit the generated CSI report. The at least one uplink resource can be determined based on the number of repeated PDSCH transmissions. The transceiver 770 can transmit the generated CSI report in the determined at least one uplink resource.

According to a possible implementation, the controller 720 can determine the at least one uplink resource by determining at least two PUCCH resource candidates. The first PUCCH resource candidate can be determined based on a second downlink slot. The second downlink slot can be in the set of downlink slots. The second PUCCH resource candidate can be determined based on a third downlink slot. The third downlink slot can be in the set of downlink slots. The controller 720 can also determine the at least one uplink resource by selecting one of the first PUCCH resource candidate or the second PUCCH resource candidate as an uplink resource based on at least one selection criterion. The transceiver 770 can transmit the generated CSI report in the selected PUCCH resource candidate.

According to a possible implementation, the controller 720 can determine an uplink PUCCH resource for HARQ-ACK feedback corresponding to DL data transmissions. The controller 720 can determine the at least one uplink resource by determining an uplink PUCCH resource to transmit the generated CSI report. The uplink PUCCH resource can be determined to be the same resource as the uplink PUCCH resource determined for HARQ-ACK feedback corresponding to the DL data transmissions. The transceiver 770 can transmit the generated CSI report in the determined uplink PUCCH resource.

According to a possible implementation, the controller 720 can determine at least one CSI reference resource comprising at least one time-domain resource and at least one frequency-domain resource based on the received control channel. The controller 720 can determine which CSI reference resources of the at least one CSI reference resource are in valid downlink slots. A downlink slot can include OFDM symbols used for DL operation. The controller 720 can generate the CSI report based on measurements associated with the determined CSI reference resources that are in valid downlink slots.

In operation as a network entity according to a possible embodiment, the controller 720 can control operations of the apparatus 700. For example, the controller can generate the signals and information disclosed in the present and other embodiments. The transceiver 770 can transmit a control channel containing DCI with a downlink DCI format in a first downlink slot. The DCI can contain a CSI report trigger that triggers a CSI report. The DCI can schedule PDSCH transmissions repeated a number of times in a set of downlink slots. Each PDSCH transmission of the repeated PDSCH transmissions can be in a separate downlink slot. The transceiver 770 can receive a CSI report in at least one uplink resource in response to transmitting the DCI containing the CSI report trigger. The at least one uplink resource can be determined based on the number of repeated PDSCH transmissions.

In operation as a UE according to a possible embodiment, the transceiver 770 can receive a configuration parameter for a CSI resource set. The configuration parameter can indicate a first offset applicable to the CSI resource set. The transceiver 770 can receive a control channel containing DCI with a downlink DCI format in a first downlink slot. The DCI can indicate a second offset applicable to the CSI resource set. The second offset can be applicable to all of a plurality of CSI resource sets including the CSI resource set. A higher layer that is higher than a physical layer can configure a presence of a bit field in the DCI indicating the second offset. The controller 720 can determine a second downlink slot in which the CSI resource set is transmitted by a network entity for an active BWP based on the first offset and the second offset.

According to a possible embodiment, the DCI can be first DCI. The transceiver 770 can receive second DCI in a third downlink slot. The second DCI can include an aperiodic CSI request. The second DCI that contains the aperiodic CSI request and the first DCI indicating the second offset can be the same DCI. A time gap between the third downlink slot containing the second DCI and the second downlink slot in which the CSI resource set is transmitted by the network entity can be based on the first offset and the second offset.

According to a possible embodiment, transceiver 770 can receive an aperiodic CSI request that triggers performing aperiodic CSI reporting using the CSI resource set. The transceiver 770 can receive the CSI resource set in the determined second downlink slot. The controller 720 can generate a CSI report based on the received CSI resource set in response to receiving the aperiodic CSI request.

According to a possible embodiment, the transceiver 770 can receive a second DCI including an aperiodic CSI request in a third downlink slot. The second downlink slot containing the CSI resource set can be determined to be in a same slot as the third downlink slot containing the second DCI including the aperiodic CSI request.

According to a possible embodiment, the DCI can be a first DCI that indicates an aperiodic CSI request. The transceiver 770 can receive a second DCI in a third downlink slot. The first downlink slot and the third downlink slot can be different. The second DCI can indicate the aperiodic CSI request and a third offset applicable to the CSI resource set. The second offset and the third offset can be different. The controller 720 can determine a fourth downlink slot in which the CSI resource set is transmitted based on the first offset and the third offset. The second downlink slot containing the CSI resource set and the fourth downlink slot containing the CSI resource set can be the same slot. The controller 720 can generate a CSI report based on the measurements of the CSI resource set in response to receiving the aperiodic CSI request.

In operation as a network entity according to a possible embodiment, the controller 720 can control operations of the apparatus 700. The transceiver 770 can transmit a configuration parameter for a CSI resource set. The configuration parameter can indicate a first offset applicable to the CSI resource set. The transceiver 770 can transmit a control channel containing DCI with a downlink DCI format in a first downlink slot. The DCI can indicate a second offset applicable to the CSI resource set. The transceiver 770 can transmit a second downlink slot including the CSI resource set for an active BWP based on the first offset and the second offset. The controller 720 can also generate signals transmitted by the transceiver. For example, the controller 720 can generate the configuration parameter, the DCI, the resource set, and other signals and parameters.

At least some embodiments can provide a method including receiving a control channel containing a DCI with a downlink DCI format in a first downlink slot. The DCI can schedule DL data transmissions, such as PDSCH, repeated 'k' times. The DCI can contain a trigger, triggering a CSI report. The method can include determining a set of CSI reference resources defining a set of time-domain resources and a set of frequency-domain resources based on at least one of 'k', the first downlink slot, and the triggered CSI report. The method can include determining which one of the CSI reference resources of the set of CSI reference resources are in valid downlink slots. The method can include deriving/calculating/generating the CSI report according to the triggered CSI report and based on measurements associated with the determined set of CSI reference resources corresponding to determined valid downlink slots. A downlink slot can be composed of OFDM symbols used for DL operation. Determining valid downlink slots can include determining all CSI reference resources of the set of reference resources to be valid if at least one of them is valid. The set of CSI reference resources can include only one CSI reference resource. The CSI reference resource can be determined to be the latest instance of scheduled repeated PDSCH that is a valid downlink slot. The CSI reference resource can be determined to be the latest instance of repeated PDSCH that is resulted in successful decoding of the transport block corresponding to the PDSCH and that is a valid downlink slot. The CSI reference resource can be determined based on the DL DCI.

At least some embodiments can provide a method including receiving a control channel containing DCI with a downlink DCI format in a first downlink slot. The DCI can schedule DL data transmissions, such as PDSCH transmissions, repeated 'k' times in a set of downlink slots, and each PDSCH repetition can be in a downlink slot. The DCI can contain a trigger triggering a CSI report. The method can include generating a CSI report according to the triggered CSI report. The method can include determining a set of uplink resources to transmit the generated CSI report, based on at least one of 'k', the first downlink slot, and the triggered CSI report. The method can include transmitting the generated CSI report in the determined set of uplink resources. The set of uplink resources can contain one uplink PUCCH resource. The method can include determining at least two PUCCH resource candidates. The first PUCCH resource candidate can be associated with a second downlink slot of the set of downlink slots. The second PUCCH resource candidate can be associated with a third downlink slot of the set of downlink slots. The method can include selecting one of the first or second PUCCH resource candidate based on a selection criterion. The selection criterion can be to select the PUCCH resource candidate that occurs earlier. The selection criterion can be to select the PUCCH resource candidate that is associated with a downlink slot which is the same downlink slot as the latest PDSCH repetition, such as the 'k'th PDSCH transmission. The selection criterion can be to select the PUCCH resource candidate that is associated with a downlink slot that is the same downlink slot as the latest PDSCH repetition that resulted in successful decoding of the transport block corresponding to the PDSCH.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method at a device, the method comprising:
receiving a control channel in a first downlink slot, the control channel containing downlink control information (DCI) with a downlink DCI format,
where the DCI contains a channel state information (CSI) report trigger that triggers a CSI report,
where the DCI schedules physical downlink shared channel (PDSCH) transmissions repeated a number of times in a set of downlink slots, and
where each PDSCH transmission of the repeated PDSCH transmissions is in a separate downlink slot;
generating a CSI report in response to receiving the CSI report trigger;
determining at least one uplink resource to transmit the generated CSI report, where the at least one uplink resource is determined based on the number of repeated PDSCH transmissions; and
transmitting the generated CSI report in the determined at least one uplink resource.

2. The method according to claim 1, wherein the at least one uplink resource for transmitting the CSI report is further determined based on attributes of the CSI report.

3. The method according to claim 1,
wherein determining the at least one uplink resource further comprises:
  determining at least two physical uplink control channel (PUCCH) resource candidates including a first PUCCH resource candidate and a second PUCCH resource candidate,
    where the first PUCCH resource candidate is determined based on a second downlink slot, where the second downlink slot is in the set of downlink slots, and
    where the second PUCCH resource candidate is determined based on a third downlink slot, where the third downlink slot is in the set of downlink slots; and
  selecting one of the first PUCCH resource candidate or the second PUCCH resource candidate as an uplink resource based on at least one selection criterion, and
wherein transmitting comprises transmitting the generated CSI report in the selected PUCCH resource candidate.

4. The method according to claim 3, wherein the at least one selection criterion is to select between the first PUCCH resource candidate and the second PUCCH resource candidate for the earliest determined PUCCH resource candidate that occurs earlier than the other determined PUCCH resource candidate.

5. The method according to claim 3, wherein the at least one selection criterion is to select the PUCCH resource candidate that is associated with a downlink slot that is the same downlink slot as a most recent PDSCH repetition.

6. The method according to claim 3, wherein the at least one selection criterion is to select the PUCCH resource candidate that is associated with a downlink slot that is the same downlink slot as the latest PDSCH repetition that resulted in successful decoding of a transport block corresponding to the PDSCH.

7. The method according to claim 1, further comprising determining a physical uplink control channel (PUCCH) resource for hybrid automatic repeat request acknowledgement (HARQ-ACK) feedback corresponding to downlink data transmissions,
wherein determining the at least one uplink resource further comprises determining an uplink PUCCH resource to transmit the generated CSI report, where the uplink PUCCH resource is determined to be the same resource as the uplink PUCCH resource determined for HARQ-ACK feedback corresponding to the downlink data transmissions, and
wherein transmitting the generated CSI report comprises transmitting the generated CSI report in the determined uplink PUCCH resource.

8. The method according to claim 1, further comprising:
multiplexing a hybrid automatic repeat request acknowledgement (HARQ-ACK) feedback associated with a downlink data transmissions with the generated CSI report; and
transmitting the HARQ-ACK feedback on the uplink resource.

9. The method according to claim 1, further comprising determining an uplink PUCCH resource for hybrid automatic repeat request acknowledgement (HARQ-ACK) feedback associated with downlink data transmissions,
wherein determining the at least one uplink resource further comprises determining an uplink PUCCH resource to transmit the generated CSI report, where the uplink PUCCH resource to transmit the generated CSI report is determined to be different from the uplink PUCCH resource determined for HARQ-ACK feedback associated with the downlink data transmissions.

10. The method according to claim 1, wherein the at least one uplink resource is further determined based on which transmission-reception point is used for communication.

11. The method according to claim 1, wherein the generated CSI report has a size smaller than a threshold size.

12. The method according to claim 1 further comprising:
determining at least one CSI reference resource comprising at least one time-domain resource and at least one frequency-domain resource based on the received control channel; and
determining which CSI reference resources of the at least one CSI reference resource are in valid downlink slots,
wherein generating the CSI report comprises generating the CSI report based on measurements associated with the determined CSI reference resources that are in valid downlink slots,
wherein a downlink slot comprises orthogonal frequency division multiplexing (OFDM) symbols used for downlink operation,
wherein a downlink slot is a valid downlink slot if it comprises at least one symbol assigned by a higher layer configuration for downlink operation, and
wherein the at least one CSI reference resource is determined based on the received control channel by being based on the number of repeated PDSCH transmissions and based on attributes of the CSI report.

13. The method according to claim 1 further comprising:
determining at least one CSI reference resource comprising at least one time-domain resource and at least one frequency-domain resource based on the received control channel; and
determining which CSI reference resources of the at least one CSI reference resource are in valid downlink slots,
wherein generating the CSI report comprises generating the CSI report based on measurements associated with the determined CSI reference resources that are in valid downlink slots,
wherein a downlink slot comprises orthogonal frequency division multiplexing (OFDM) symbols used for downlink operation,
wherein a downlink slot is a valid downlink slot if it comprises at least one symbol assigned by a higher layer configuration for downlink operation,
wherein the at least one CSI reference resource includes only one CSI reference resource, and
wherein the at least one time-domain resource of the CSI reference resource is determined to be the same slot as the first downlink slot.

14. The method according to claim 1 further comprising:
determining at least one CSI reference resource comprising at least one time-domain resource and at least one frequency-domain resource based on the received control channel; and
determining which CSI reference resources of the at least one CSI reference resource are in valid downlink slots,
wherein generating the CSI report comprises generating the CSI report based on measurements associated with the determined CSI reference resources that are in valid downlink slots,
wherein a downlink slot comprises orthogonal frequency division multiplexing (OFDM) symbols used for downlink operation, wherein a downlink slot is a valid downlink slot if it comprises at least one symbol assigned by a higher layer configuration for downlink operation, wherein the at least one CSI reference resource includes only one CSI reference resource, and wherein the CSI reference resource is determined to be a most recent slot including an instance of a PDSCH of the repeated PDSCH that is in a valid downlink slot.

15. The method according to claim 1 further comprising:

determining at least one CSI reference resource comprising at least one time-domain resource and at least one frequency-domain resource based on the received control channel; and determining which CSI reference resources of the at least one CSI reference resource are in valid downlink slots, wherein generating the CSI report comprises generating the CSI report based on measurements associated with the determined CSI reference resources that are in valid downlink slots, wherein a downlink slot comprises orthogonal frequency division multiplexing (OFDM) symbols used for downlink operation, wherein a downlink slot is a valid downlink slot if it comprises at least one symbol assigned by a higher layer configuration for downlink operation, wherein the at least one CSI reference resource includes only one CSI reference resource, and wherein the CSI reference resource is determined to be a most recent slot including an instance of a PDSCH of the repeated PDSCH that resulted in successful decoding of a transport block in the repeated PDSCH and that is in a valid downlink slot.

16. An apparatus comprising:

a transceiver that receives a control channel containing downlink control information (DCI) with a downlink DCI format in a first downlink slot, where the DCI contains a channel state information (CSI) report trigger that triggers a CSI report, where the DCI schedules physical downlink shared channel (PDSCH) transmissions repeated a number of times in a set of downlink slots, and where each PDSCH transmission of the repeated PDSCH transmissions is in a separate downlink slot; and a controller coupled to the transceiver, where the controller generates a CSI report in response to receiving the CSI report trigger, and determines at least one uplink resource to transmit the generated CSI report, where the at least one uplink resource is determined based on the number of repeated PDSCH transmissions, wherein the transceiver transmits the generated CSI report in the determined at least one uplink resource.

17. The apparatus according to claim 16, wherein the controller determines the at least one uplink resource by:

determining at least two physical uplink control channel (PUCCH) resource candidates including a first PUCCH resource candidate and a second PUCCH resource candidate, where the first PUCCH resource candidate is determined based on a second downlink slot, where the second downlink slot is in the set of downlink slots, and where the second PUCCH resource candidate is determined based on a third downlink slot, where the third downlink slot is in the set of downlink slots, and selecting one of the first PUCCH resource candidate or the second PUCCH resource candidate as an uplink resource based on at least one selection criterion, and wherein the transceiver transmits the generated CSI report in the selected PUCCH resource candidate.

18. The apparatus according to claim 16, wherein the controller determines an uplink physical uplink control channel (PUCCH) resource for hybrid automatic repeat request acknowledgement (HARQ-ACK) feedback corresponding to downlink data transmissions, and determines the at least one uplink resource by determining an uplink PUCCH resource to transmit the generated CSI report, where the uplink PUCCH resource is determined to be the same resource as the uplink PUCCH resource determined for HARQ-ACK feedback corresponding to the downlink data transmissions, and wherein the transceiver transmits the generated CSI report in the determined uplink PUCCH resource.

19. The apparatus according to claim 17, wherein the controller determines at least one CSI reference resource comprising at least one time-domain resource and at least one frequency-domain resource based on the received control channel, determines which CSI reference resources of the at least one CSI reference resource are in valid downlink slots, and generates the CSI report based on measurements associated with the determined CSI reference resources that are in valid downlink slots, wherein a downlink slot comprises orthogonal frequency division multiplexing symbols used for downlink operation, and wherein a downlink slot is a valid downlink slot if it comprises at least one symbol assigned by a higher layer configuration for downlink operation.

20. A processor for wireless communication, comprising:

at least one controller coupled with at least one memory and configured to cause the processor to:

receive a control channel in a first downlink slot, the control channel containing downlink control information (DCI) with a downlink DCI format, where the DCI contains a channel state information (CSI) report trigger that triggers a CSI report, where the DCI schedules physical downlink shared channel (PDSCH) transmissions repeated a number of times in a set of downlink slots, and where each PDSCH transmission of the repeated PDSCH transmissions is in a separate downlink slot;

generate a CSI report in response to receiving the CSI report trigger;

determine at least one uplink resource to transmit the generated CSI report, where the at least one uplink resource is determined based on the number of repeated PDSCH transmissions; and transmit the generated CSI report in the determined at least one uplink resource.

* * * * *